March 31, 1970   D. FRITSCH   3,504,206
INDEXING MECHANISM
Filed Aug. 27, 1968

INVENTOR
DANIEL FRITSCH

BY   Le Blanc & Shur
ATTORNEYS 3,504,206
INDEXING MECHANISM
Daniel Fritsch, Lancaster, Pa., assignor to Hamilton
Watch Company, Lancaster, Pa., a corporation of
Pennsylvania
Filed Aug. 27, 1968, Ser. No. 755,687
Int. Cl. H02k 7/06
U.S. Cl. 310—21                                       12 Claims

ABSTRACT OF THE DISCLOSURE

The indexing mechanism includes a toothed ferromagnetic index wheel having a permanent magnet in spaced apposition to the teeth, such that its magnetic force positions the wheel with the width of a tooth in direct apposition to the magnet. A spring engages between the teeth and detents the wheel. In this mechanically detented wheel position, the magnet exerts an attractive force on the next tooth of the wheel tending to rotate the wheel. A cam, vibrating reed, or piezoelectric element operates to withdraw the spring from between the teeth to free the wheel for rotation. When the spring is withdrawn, the magnet attracts the next tooth and advances the wheel such that the width of such next tooth lies in direct apposition to the magnet. When the spring is released, it engages a tooth face to advance the index wheel in a like direction, positioning the wheel relative to the magnet such that the magnet lies in apposition between an adjacent pair of teeth and exerts a magnetic attraction on the next wheel tooth.

---

The present invention relates to an indexing mechanism for clocks, watches, and other horological devices, as well as other mechanical devices requiring an indexing system. The present invention particularly relates to a mechanical magnetic indexing mechanism wherein an index wheel is stepped unidirectionally by successively operating mechanical and magnetic drive mechanisms and which mechanisms alternately detent the index wheel.

In horological devices such as watches and clocks, and in many other mechanical devices, it is often necessary to rotate a member unidirectionally in a timed relation or at a predetermined rate. Many methods have been proposed and devices constructed to accomplish this purpose. Generally speaking, in horological devices, this is done with a toothed wheel which is advanced step by step by means of periodic contact with an oscillating member. The wheel is sometimes formed of a magnetic material and detented in an advanced position by means of a magnet disposed in apposition to the index wheel teeth. The wheels are usually mechanically driven throughout the indexing operation with the magnet serving principally as a means to retain the wheel in an advanced position constraining further rotation thereof.

The present invention provides an indexing mechanism wherein an index wheel is stepped uidirectionally in response to alternately operative mechanical and magnetic drives. To this end, the present invention provides a toothed index wheel formed of a magnetic material and a permanent magnet disposed in spaced apposition to the periphery of the wheel with the magnetic axis of the magnet generally perpendicular to the wheel and generally parallel to the wheel staff. The magnet exerts a magnetic attraction on the individual teeth of the wheel tending to rotate the wheel and locate the closest tooth in direct apposition thereto, i.e., to rotate the wheel such that the closest tooth and the magnet form the most efficient magnetic circuit. To step the wheel a member mounted for reciprocatory or oscillatory movement into and out of the peripheral confines of the index wheel teeth is moved into the peripheral confines of the teeth to engage a tooth face in a manner as to mechanically advance the index wheel until the member bottoms in the valley between the engaged tooth and an adjacent tooth. The wheel is thus mechanically detented. The permanent magnet is located such that when the wheel is mechanically detented, it lies between an adjacent pair of teeth and exerts an attractive force on the next tooth of the index wheel. When the member is moved out of confines of the index wheel teeth, the wheel is free to rotate and this magnetic attraction advances the index wheel in a like direction as that caused by the mechanical engagement between the member and teeth. The next tooth is thus located in direct apposition to the magnet and the wheel is magnetically detented until the member again moves into the peripheral confines of the teeth to mechanically advance the wheel.

Various forms of mechanical indexing devices are herein described and illustrated. In one form a rotary cam periodically engages a rectilinear spring to retract the spring end against the bias of the spring from within the peripheral confines of the index wheel teeth. The magnet then advances and detents the wheel as previously described. When the cam releases the spring, the spring end engages a tooth face to advance the wheel from its magnetically detented position to a position whereat the magnet exerts an attractive force on the next tooth. In another form, a piezoelectric element pivots a lever whereby the deflection of the element is amplified through the lever to alternately retract and release the spring. In still another form, one end of an elongated spring is sandwiched between a pair of piezoelectric elements, the spring and elements being cantilevered to a fixed support. When the elements are excited by an applied voltage, the elements deflect the spring into and out of the peripheral confines of the index wheel teeth, whereby the spring and magnet alternately cooperate as before to step the wheel unidirectionally. The piezoelectric elements may comprise crystals or ceramics. In a further form, a vibrating reed may be employed to oscillate a spring into and out of engagement with the index wheel teeth whereby the wheel is stepped and detented in cooperation with the permanent magnet as hereinbefore described.

Accordingly, it is a primary object of the present invention to provide an improved indexing mechanism.

It is an other object of the present invention to provide an improved indexing mechanism for unidirectional rotation of an index wheel from an oscillatory member.

It is still another object of the present invention to provide an indexing mechanism employing both a mechanical and a magnetic drive.

It is a further object of the present invention to provide a mechanical-magnetic indexing mechanism having an index wheel which is alternately advanced by mechanical and magnetic drives.

It is a still further object of the present invention to provide an indexing mechanism having an index wheel which is alternately mechanically and magnetically detented.

It is a related object of the present invention to provide a mechanical-magnetic indexing mechanism which is simple in operation, readily and easily manufactured, and low in cost.

It is also a related object of the present invention to provide a mechanical-magnetic indexing mechanism having the foregoing characteristics which employs an electro-mechanical transducer as a part of the mechanical drive and detent therefor.

These and further objects and advantages of the present invention will become more apparent upon reference to the following specification, claims, and appended drawings, wherein:

Figure 1:
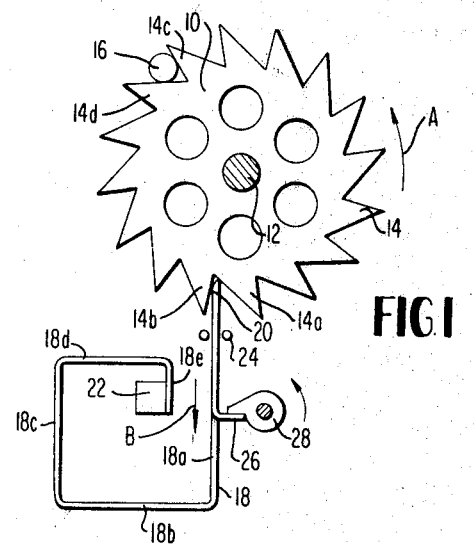
FIGURE 1 is a schematic illustration of a mechanical-magnetic indexing mechanism constructed in accordance with the present invention and showing the index wheel thereof in a mechanically detented position.
Figure 2:
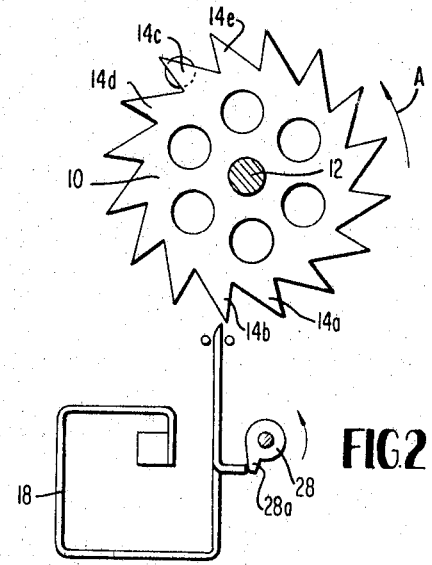
FIGURE 2 is a view similar to FIGURE 1 illustrating the index wheel in a magnetically detented position.
Figure 3:
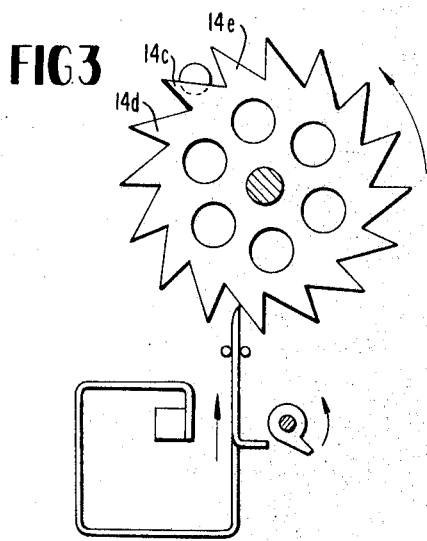
FIGURE 3 is a view similar to FIGURE 1 illustrating the mechanical advancement of the index wheel.

Referring now to the drawings, and particularly FIGURES 1–3, there is shown an index wheel 10 pivoted for rotation about an axis 12 and having a plurality of teeth 14 formed about its periphery. Wheel 10 is adapted for unidirectional rotation by the mechanical-magnetic indexing mechanism hereof in a direction indicated by the arrow A. Wheel 10 is formed of a magnetic material, preferably ferromagnetic material, and a permanent magnet 16 is located in spaced apposition laterally of the periphery of the wheel, i.e., in lateral apposition to the teeth 14. In this manner, magnetic circuits are formed between magnet 16 and successive teeth 14 as the latter are stepped into lateral opposition to magnet 16 in a manner as will presently become clear.

A mechanical drive and detenting mechanism is illustrated and comprises a linear tension spring 18 having a free end 20 adapted for movement into and out of the peripheral confines of the index wheel 10, i.e., movement into and out of the valleys between adjacent teeth 14. The opposite end of spring 18 is fixed to a support 22 and, as clearly illustrated in the drawing, spring 18 is formed to comprise a plurality of linear portions 18a through 18e arranged at right angles to one another. The spring portion 18a carrying free end 20 extends between a pair of guide pins 24 and carries a laterally projecting pin 26. In one embodiment hereof, the came surface 28a of a continuously rotating cam 28 is located to periodically engage pin 26 and retract the free end portion 20 of spring 18 in the direction of the arrow B from the peripheral confines of wheel 10. As seen in FIGURES 2 and 3, when the cam surface 28a disengages from pin 26, the spring 18 springs back under its natural bias to locate the free end 20 thereof within the peripheral confines of the wheel 10 to first mechanically advance index wheel 10 and then to detent the same in a manner as will presently become clear.

The indexing mechanism hereof is illustrated in FIGURE 1 in a mechanically-detented position with the free end 20 of spring 18 engaging within the valley between an adjacent pair of teeth 14a and 14b preventing rotation of wheel 10 in either direction. In this position, magnet 16 is located between a pair of adjacent teeth 14c and 14d such that the magnet 16 exerts an attractive force on the tooth 14c tending to rotate the index wheel 10 in the counterclockwise direction indicated by arrow A in FIGURE 1. This magnetic rotary bias applied to wheel 10, however, is prevented from rotating wheel 10 by the mechanical detenting action of spring 18 as its free end 20 engages between the associated teeth 14. As cam 28 rotates, cam surface 28a engages pin 26 and retracts the free end 20 of spring 18 from the peripheral confines of wheel 10 thereby freeing wheel 10 for counterclockwise rotation under the influence of magnet 16. The attractive force between magnet 16 and index wheel tooth 14c causes the wheel 10 to advance unidirectionally in the counterclockwise direction indicated by arrow A as illustrated in FIGURE 2 such that and until the most efficient magnet circuit or coupling is formed between magnet 16 and tooth 14c. The most efficient circuit occurs when tooth 14c lies in direct lateral apposition to magnet 16 as illustrated in FIGURE 2. Index wheel 10 is thus stepped a circumferential difference approximately equal to ½ the tooth pitch. Further rotary movement of wheel 10 is restrained by this magnetic coupling and wheel 10 is accordingly magnetically detented in the position shown in FIGURE 2.

As cam 28 continues to rotate, the cam surface 28a disengages from pin 26 and releases spring 18 such that the free end 20 thereof moves into the peripheral confines of wheel 10. It will be appreciated that the tip of tooth 14b has been advanced approximately ½ the tooth pitch such that the free end 20 of spring 18, when the latter moves into the peripheral confines of wheel 10, engages the rear face of tooth 14b at a point adjacent to the tip of the latter. Further inward movement of the free end 20 of spring 18 under the force of its natural bias cams or steps index wheel 10 in a counterclockwise direction as seen in FIGURE 3 against the detenting bias of the magnetic coupling between magnet 16 and tooth 14c until the free spring end 20 engages in the valley between the next adjacent teeth 14. This camming action advances wheel 10 approximately ½ the tooth pitch or the remaining portion of the full tooth pitch and locates the index wheel 10 such that a pair of teeth 14c and 14e straddle magnet 16. This camming action also locates the index wheel such that there is a magnetic attractive force between the next index wheel tooth 14e and magnet 16. The index wheel 10 thus lies in a spring detented position (FIGURE 1) until cam 28 completes a full revolution whereupon the spring is retracted and the wheel advanced in the manner previously described. Thus, it will be seen that index wheel 10 is alternately advanced by the magnet and the mechanical camming action of the spring with spring 18 detenting wheel 10 when magnet 16 exerts a rotary bias on wheel 10 and the magnet 16 detenting wheel 10 when spring 18 is disengaged or retracted from the peripheral confines of index wheel teeth 14.

The cam 28a may be continuously driven by a motor, not shown, or any other type of drive providing a continuous one-way rotary action. Alternatively, an electromechanical transducer for converting the electronic oscillations to a mechanical motion can be employed with the mechanical-magnetic indexing mechanism hereof.

Figure 4:
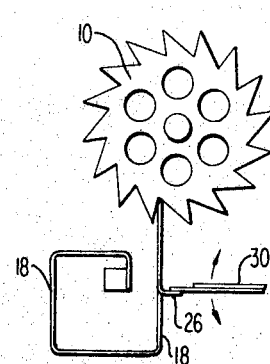
FIGURE 4 is a schematic illustration of another form of the mechanical magnetic index mechanism hereof shown on a reduced scale and illustrating the electromechanical transducer comprising a vibrating reed employed therewith.

One form of transducer is illustrated in FIGURE 4 and comprises a reed 30 which vibrates at or near its resonant frequency in a well known manner upon electrical energization from an electrical source, not shown. The mechanical deflections provided at the free end of the beam 31 which is coupled to the reed 30 are employed to periodically retract the free end 20 of spring 18 from within the peripheral confines of index wheel 10 in the manner previously described. The magnetic and mechanical action of the wheel 10, magnet 16, and spring 18 are as described previously and the index wheel 10 is thus unidirectionally stepped under the control of the vibrating reed 30.

Figure 5:
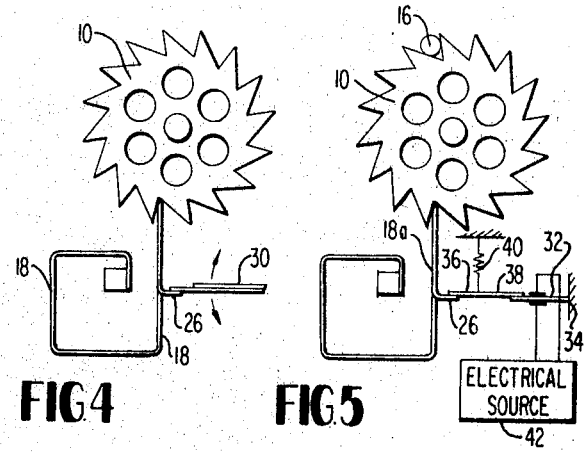
FIGURE 5 is a view similar to FIGURE 4 illustrating an electromechanical transducer comprising a piezoelectric element and mechanical motion amplifier as employed with the mechanical and magnetic indexing mechanism hereof.

Referring now to FIGURE 5, there is shown another form of electrical-mechanical transducer which is operable to reciprocate the free end 20 of spring 18 into and out of the peripheral confines of index wheel 10 as previously described. In this form, plate 32 having piezoelectric properties, such as a piezoelectric crystal or a ceramic piezoelectric such as barium titinate, is cantilevered as at 34 and its free end engages one end of a lever 36 pivoted at 38. The opposite end of lever 36 engages pin 26 of spring 18 and lever 36 is biased by a spring 40 for rotation in a clockwise direction, as seen in FIGURE 5, about pivot 38. The piezoelectric plate or beam may be periodically electrically energized by a source 42 and is thus physically deformed. This deformation is characterized by a deflection at the free end of the plate which thereby pivots lever 36 counterclockwise as seen in FIGURE 5 about pivot 38. Lever 36 amplifies the physical deformation or deflection of the piezoelectric plate 32 such that spring portion 18a is retracted a sufficient distance as to withdrawn the free end 20 thereof from within the peripheral confines of wheel 10 whereby wheel 10 is free to advance under the bias of the magnet as previously described.

When the electrical signal is removed from plate 32, it returns to its original shape. Spring 40 thus returns lever 36 to the illustrated position permitting the free end 20 of spring 18 to return within the peripheral confines of wheel 10 and mechanically step and detent the latter as previously described.

Figure 6:
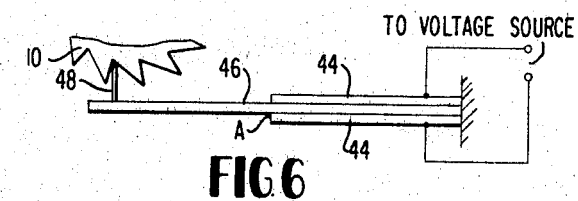
FIGURES 6 and 7 illustrate piezoelectric elements coupled with resonant springs employed in conjunction with the indexing mechanism hereof.
Figure 7:
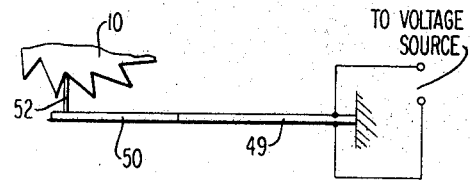

The deflection of the free end of cantilevered piezoelectric beam 32 is a function of the width, thickness and length of the beam 32, the applied voltage and whether or not the frequency of the voltage is near or at the resonant frequency of the beam. It has been found that a significant deflection, adequate for present purposes, can be provided by applying a sufficient voltage to beam 32 even though the voltage frequency is considerably different that the resonant frequency of the plate. Preferably, this deflection is amplified through a mechanical system such as the illustrated pivoted lever.

Where only small voltages are available, as in a watch, the piezoelectric plate can be employed to excite a resonant system to obtain mechanical motion amplification. This type of system is illustrated in FIGURES 6 and 7. In FIGURE 6, piezoelectric ceramic elements 44, preferably comprising a two plate sandwich construction known as a bimorph manufactured by the Clevite Corporation of Ohio, are located on opposite sides of a cantilevered resonant spring 46. The free end of spring 46 carries a pin 48 adapted for reciprocating movement into and out of the peripheral confines of index wheel 10 similary as the free end 20 of spring 18 reciprocates in the previous embodiments. The elements 44 extend for a short distance along the end of spring 46 adjacent the fixed end thereof leaving the spring 46 free to flex along its opposite end portion. When the voltage is applied, the elements 44 will deflect at their free ends indicated at A. When the voltage is applied at a frequency equal to the resonant frequency of the spring 46, the deflection of the piezoelectric element 44 at point A will cause the resonant spring 46 to amplify such deflection sufficiently to cause pin 48 to reciprocate into and out of the peripheral confines of index wheel 10 thereby providing the mechanical stepping and detenting action of the mechanical-magnetic indexing mechanism hereof.

Referring now to FIGURE 7, there is shown a cantilevered piezoelectric plate or beam 49 preferably a multimorph type piezoelectric element mounting a resonant spring adjacent its free end. A pin 52 is carried by the free end of spring 50. The piezoelectric element known as a multimorph and manufactured by the Clevite Corporation of Ohio comprises a single plate or beam having a series of parallel lengthwise extending holes coated with graphite which provide the central conductor required for polarization. When a voltage is applied to the cantilevered multimorph type piezoelectric beam 49, it will deflect at its free end. When the voltage is applied at a frequency equal to the resonant frequency of spring 50, the deflection of the free end of the multimorph beam will be amplified at pin 52 whereby the latter will reciprocate into and out of the peripheral confines of index wheel 10. It will thus be seen that the electrically-mechanical transducers illustrated in FIGURES 4 through 7 provide an efficient system for stepping the index wheel of a timekeeping mechanism.

Thus, the invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. An indexing mechanism comprising a toothed index wheel having magnetic properties, and means for advancing said wheel unidirectionally including a member movable between first and second positions respectively into and out of the peripheral confines af the index wheel teeth, means for periodically moving said member between said first and second positions, said member when in said first position mechanically locking said wheel from movement, and a magnet magnetically coupled to said index wheel and located to bias said wheel for movement in the one direction when said member lies in said first position, said wheel being advanced by said magnetic bias in response to movement of said member from said first position to said second position, said member being engageable with said index wheel teeth when moved from said second position to said first position to advance said wheel in the one direction.

2. An indexing mechanism according to claim 1 wherein said magnet locks said index wheel from movement in an advanced position when said member lies in said second position, said member being engageable with said index wheel teeth to advance said index wheel from its magnetically locked position in the one direction.

3. An indexing mechanism according to claim 1 including a spring, said member comprising an end portion of said spring and said moving means being engageable with said spring to move said spring end portion between said first and second positions.

4. An index mechanism according to claim 3 wherein said spring end portion is normally biased by said spring into said first position and said moving means includes a rotary cam for periodically retracting said spring end portion against the bias of said spring into said second position.

5. An indexing mechanism according to claim 1 wherein said moving means includes a vibrating reed.

6. An indexing mechanism according to claim 5 wherein said reed is fixed at one end and free for vibratory movement at its opposite end, a spring, said member comprising an end portion of said spring, said free end of said reed being engageable with said spring to move said spring end portion from said first position to said second position.

7. An indexing mechanism according to claim 1 wherein said moving means includes a piezoelectric element.

8. An indexing mechanism according to claim 7 including an elongated element, said member comprising an end portion of said element, said element being fixed at its opposite end, said piezoelectric element comprising a pair of plates mounted on opposite sides of said elongated element adjacent the fixed end thereof, and means for applying a voltage to said plates to deflect said element and its end portion.

9. An indexing mechanism according to claim 7 including means for applying an electrical signal to said piezoelectric element to deflect the latter, and means for amplifying the magnitude of said deflection.

10. An indexing mechanism according to claim 9 wherein said amplifying means includes a spring, said piezoelectric element being operable to vibrate said spring at its resonant frequency.

11. An indexing mechanism according to claim 7 wherein said moving menas includes a lever pivotably mounted intermediate its ends, one end portion of said lever being engageable with said piezoelectric element with the opposite end portion thereof being engageable with said movable member, means for applying an electrical signal to said piezoelectric element to deflect the latter and pivot said lever whereby said member is movable from said first to said second position.

12. An indexing mechanism according to claim 1 wherein said moving means includes a rotary cam.

References Cited

UNITED STATES PATENTS

| | | | |
|---|---|---|---|
| 3,147,583 | 9/1964 | Fritsch | 310—39 XR |
| 3,090,245 | 5/1963 | Reber | 74—126 |
| 2,808,698 | 10/1957 | Steiger | 58—116 |
| 1,623,026 | 3/1927 | Cabezola. | |
| 3,204,133 | 8/1965 | Tschudin | 310—22 |
| 3,159,759 | 12/1964 | Conrad et al. | 74—126 XR |
| 3,243,951 | 4/1966 | Kawakawi | 58—23 |
| 1,403,767 | 1/1922 | Goff | 310—21 |

MILTON O. HIRSHFIELD, Primary Examiner

B. A. REYNOLDS, Assistant Examiner

U.S. Cl. X.R.

310—8.3, 25; 74—126; 58—116

UNITED STATES PATENT OFFICE
CERTIFICATE OF CORRECTION

Patent No. 3,504,206

March 31, 1970

Daniel Fritsch

It is certified that error appears in the above identified patent and that said Letters Patent are hereby corrected as shown below:

Column 2, line 39, after "comprise" insert -- piezo-electric --. Column 3, line 9, "index" should read -- indexing --; line 46, "came" should read -- cam --. Column 4, line 4, "magnet" should read -- magnetic --. Column 5, line 56, after "spring" insert -- 50 --. Column 6, line 72, "menas" should read -- means --.

Signed and sealed this 15th day of September 1970.

(SEAL)
Attest:

Edward M. Fletcher, Jr.
Attesting Officer

WILLIAM E. SCHUYLER, JR.
Commissioner of Patents